(12) United States Patent
Knoche et al.

(10) Patent No.: US 11,707,975 B2
(45) Date of Patent: Jul. 25, 2023

(54) AXLE SUBASSEMBLY INCLUDING AN ELECTRIC DRIVE/GENERATOR UNIT, AND METHOD FOR CONTROLLING AN ELECTRIC DRIVE/GENERATOR UNIT OF AN AXLE SUBASSEMBLY

(71) Applicant: AKTIEBOLAGET SKF, Gothenburg (SE)

(72) Inventors: Christian Knoche, Schweinfurt (DE); Bernd Stephan, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 507 days.

(21) Appl. No.: 16/848,879

(22) Filed: Apr. 15, 2020

(65) Prior Publication Data

US 2020/0353806 A1    Nov. 12, 2020

(30) Foreign Application Priority Data

May  8, 2019   (DE) .......................... 102019206627.5
May 27, 2019   (DE) .......................... 102019207730.7

(51) Int. Cl.
| | | |
|---|---|---|
| *B60K 1/00* | (2006.01) | |
| *H02K 7/00* | (2006.01) | |
| *H02K 11/00* | (2016.01) | |
| *B60B 35/18* | (2006.01) | |
| *B62D 59/04* | (2006.01) | |
| *B60B 35/12* | (2006.01) | |
| *B60K 1/04* | (2019.01) | |

(52) U.S. Cl.
CPC ............. *B60K 1/00* (2013.01); *B60B 35/128* (2013.01); *B60B 35/18* (2013.01); *B60K 1/04* (2013.01); *B62D 59/04* (2013.01); *H02K 7/003* (2013.01); *H02K 11/0094* (2013.01)

(58) Field of Classification Search
CPC .. B60K 1/00; B60K 1/04; B60B 35/18; B62D 59/04; H02K 7/003; H02K 11/0094
See application file for complete search history.

(56) References Cited

U.S. PATENT DOCUMENTS

| | | | | |
|---|---|---|---|---|
| 1,149,542 A | * | 8/1915 | Risley ..................... | F16C 25/06 |
| | | | | 384/552 |
| 1,766,163 A | * | 6/1930 | Vukosav ............... | H02J 7/1415 |
| | | | | 318/1 |

(Continued)

FOREIGN PATENT DOCUMENTS

| | | | | |
|---|---|---|---|---|
| CA | 2457216 C | * | 9/2011 | ............... B60K 1/00 |
| CN | 208069852 U | * | 11/2018 | |

(Continued)

*Primary Examiner* — James A Shriver, II
*Assistant Examiner* — Michael T. Walsh
(74) *Attorney, Agent, or Firm* — J-Tek Law PLLC; Scott T. Wakeman; Mark A. Ussai

(57) ABSTRACT

An axle subassembly of a trailer of a vehicle includes a wheel bearing having an outer ring mechanically connected to a shaft and an electric drive/generator operably connected to the shaft, wherein the electric drive/generator in a first state is configured to generate electricity from a rotation of the shaft and wherein the electric drive/generator in a second state is configured to drive the shaft, and a controller configured to shift the electric drive/generator unit into the first state and into the second state.

14 Claims, 5 Drawing Sheets

(56) References Cited

U.S. PATENT DOCUMENTS

| | | | | |
|---|---|---|---|---|
| 2,052,524 A * | 8/1936 | Baker | .................... | B60B 35/121 |
| | | | | 301/1 |
| 2,693,393 A * | 11/1954 | Heth | ................. | B60B 35/18 |
| | | | | 180/385 |
| 6,557,947 B1 * | 5/2003 | Hunt | .................... | B60B 27/0078 |
| | | | | 301/105.1 |
| 7,147,070 B2 * | 12/2006 | Leclerc | .................... | B60K 1/04 |
| | | | | 180/65.25 |
| 8,365,849 B2 * | 2/2013 | Bartel | .................. | B60L 7/10 |
| | | | | 303/146 |
| 8,853,869 B2 * | 10/2014 | Nikolic | ................ | H02K 7/116 |
| | | | | 290/1 R |
| 9,145,027 B2 * | 9/2015 | Song | ..................... | B60B 35/18 |
| 9,333,843 B2 * | 5/2016 | Suzuki | ................... | B60B 35/18 |
| 9,534,665 B1 * | 1/2017 | Pritchard | ................ | B60K 1/00 |
| 10,124,841 B2 * | 11/2018 | Marquis | ................ | B60D 1/015 |
| 11,067,120 B2 * | 7/2021 | Barciet | ................ | F16C 19/361 |
| 2005/0000739 A1 * | 1/2005 | Leclerc | ................... | B60K 6/48 |
| | | | | 903/951 |
| 2013/0103238 A1 * | 4/2013 | Yu | ....................... | B60W 10/08 |
| | | | | 903/930 |
| 2015/0076949 A1 * | 3/2015 | Alim | ..................... | H02K 53/00 |
| | | | | 74/DIG. 9 |
| 2019/0070944 A1 * | 3/2019 | Soto | ....................... | B60K 6/48 |

FOREIGN PATENT DOCUMENTS

| | | | | |
|---|---|---|---|---|
| CN | 111907261 A * | 11/2020 | ........... | B60B 35/128 |
| DE | 102017110520 A1 * | 11/2018 | | |
| JP | 2012126250 A * | 7/2012 | | |
| WO | WO-2020142829 A1 * | 7/2020 | .............. | B60L 15/20 |

* cited by examiner

AXLE SUBASSEMBLY INCLUDING AN ELECTRIC DRIVE/GENERATOR UNIT, AND METHOD FOR CONTROLLING AN ELECTRIC DRIVE/GENERATOR UNIT OF AN AXLE SUBASSEMBLY

CROSS-REFERENCE

This application claims priority to German patent application no. 10 2019 206 627.5, filed on May 8, 2019, and to German patent application no. 10 2019 207 730.7, filed on May 27, 2019, and the contents of both applications are fully incorporated herein by reference.

TECHNOLOGICAL FIELD

The disclosure is directed to an axle subassembly including an electric drive/generator unit and to a method for controlling an electric drive/generator unit of an axle subassembly.

BACKGROUND

In vehicles having internal combustion engines, ever stricter requirements are set on $CO_2$ emissions. This also applies to a particular degree for commercial vehicles and thus also for tractor-trailers comprising a tractor and a trailer. Due to a variety of technical improvements, in particular of internal combustion engines, the $CO_2$ emissions of vehicles have already been significantly reduced. In the meantime, the economically usable optimization potential in internal combustion engines is largely exhausted, so that any further improvement requires a relatively large technical effort.

SUMMARY

It is therefore an aspect of the present disclosure to achieve, with reasonable effort, a reduction of the $CO_2$ emissions of a tractor-trailer comprising a tractor and a trailer.

Here the term "trailer" should be interpreted very broadly and in particular also include trailers of an articulated truck.

According to the disclosure, the axle subassembly of a trailer of a vehicle includes a rotatably supported shaft, an electric drive/generator unit, selectively for driving the shaft or for generating electricity from the rotational movement of the shaft, and a wheel bearing including an outer ring. The outer ring includes a set of first attachment bores that are disposed along a first circumference and a set of second attachment bores that are disposed along a second circumference. The first circumference has a larger radius than the second circumference. The second attachment bores serve for forming a mechanical connection between the outer ring and the shaft.

The disclosure has the advantage that with a reasonable level of effort it allows for a reduction of $CO_2$ emissions. The electric drive/generator unit can convert excess mechanical energy, for example, in an overrun operation of the trailer (e.g., when the trailer is moving faster than the tractor pulling the trailer), into electric energy that is converted at a later time into mechanical energy and is used for driving the trailer. Here it is particularly advantageous that the inventive axle subassembly can replace a conventional axle subassembly without expensive changes having to be made to the construction of the trailer. This is made possible in particular by the design of the outer ring with two sets of attachment bores, by which the outer ring is usable as an interface for the connecting of the wheel to the shaft.

Accordingly the first attachment bores can serve for forming a mechanical connection to a wheel adapter or a rim. The outer ring can include two raceways disposed axially adjacent to each other. Furthermore, the outer ring can be embodied one-part. A considerable weight saving is thereby possible in comparison to a multi-part design. In particular, the outer ring can be forged. This makes possible a high strength and hardness, and nevertheless sufficient clearance with the design.

The number of first attachment bores can be larger than the number of second attachment bores. Furthermore, the diameter of the first attachment bores can respectively be larger than the diameter of the second attachment bores. In addition, the first and second attachment bores can be offset from one another in the circumferential direction. Since smaller forces are transmitted via the second attachment bores than via the first attachment bores, due to the different design in number and/or size the manufacturing effort can be reduced, and the dimensions of the outer ring can kept more compact. This makes possible a design of the outer ring that is compatible with conventional outer rings that include only one set of attachment bores and has the further advantage of weight savings.

The disclosure furthermore relates to an axle subassembly of a trailer of a vehicle, including a wheel bearing that includes an outer ring, a shaft, a coupling, a constant velocity joint or an articulated shaft, a transmission, an electric drive/generator unit, selectively for driving the shaft or for generating electricity from the rotational movement of the shaft, and a control device for controlling the electric drive/generator unit. The shaft is mechanically connected to the outer ring and is drivable by the electric drive/generator unit via the coupling, the constant velocity joint, or the articulated shaft, and the transmission.

The coupling, the constant velocity joint or the articulated shaft, the transmission, and the electric drive/generator unit are preferably disposed axially adjacent to one another in this sequence. The coupling can be an actuatable clutch, using which an operative connection between two components, for example, the shaft and the constant velocity joint, can be selectively be formed and eliminated. In particular, in the case of an actuatable clutch it can transmit a moment via a friction connection. In particular, the formation of the operative connection can furthermore also be effected via a gear that, via a switch command, is brought axially against a motor shaft into an engagement with a counter-gear, and in the event of a switching-off is correspondingly brought out of engagement with the counter-gear.

With the exception of the wheel bearing, all components of the inventive axle subassembly can be disposed inside an axle tube. A very compact design thereby arises. However, it is also possible to arrange some components, such as, for example, the shaft and the coupling, inside the axis tube, and other components, such as, for example, the transmission, the electric drive-/generator unit, and the control device outside the axle tube. More freedom thereby arises with respect to the dimensions of the components.

The axle subassembly according to the disclosure can also include a battery for storing the electricity generated by the electric drive/generator unit. This helps to make the axle subassembly according to the disclosure self-sufficient as a functional unit. In addition, an autonomous design of the trailer with respect to the tractor is thereby facilitated so that the trailer equipped with the inventive axle subassembly can also be pulled by a conventional tractor that is not adapted to the inventive axle subassembly, and the functionality of the inventive axle subassembly is nevertheless available.

The inventive axle subassembly can include two wheel bearings, each including an outer ring, two shafts, two couplings, two constant velocity joints or articulated shafts, and two transmissions. Furthermore, the inventive axle subassembly can include two electric drive/generator units. Finally, the inventive axle subassembly can include two batteries.

The disclosure furthermore relates to a trailer of a vehicle, wherein the trailer includes an inventive axle subassembly.

The disclosure also relates to a method for controlling an electric drive/generator unit of an axle subassembly of a trailer of a vehicle, wherein the electric drive/generator unit is selectively operable in motor operation or in generator operation. In motor operation the electric drive/generator unit converts electric energy into mechanical energy that is used to drive the trailer, and in generator operation the electric drive/generator unit converts mechanical energy into electrical energy in the area of a coupling device by which the trailer is coupled to the vehicle, at least one measured value is determined, and on the basis of the measured value it is determined whether the electric drive/generator unit is driven in motor operation or in generator operation.

The inventive method has the advantage that the trailer can automatically recover energy from the tractor and use it for its drive. Here the control of this process can also be effected automatically by the tractor. Accordingly, in this way the $CO_2$ emission of any tractor can be reduced by the trailer in trailer operation.

The coupling device can be a kingpin, in particular when the trailer is embodied as an articulated-truck trailer. In generator operation it can be switched over when a force acting on the coupling device of the trailer runs counter to the direction of travel of the trailer. This indicates an overrun operation wherein excess mechanical energy is available.

It can be provided that the system is only switched over into generator operation when at least one further condition is fulfilled. The further condition can in particular relate to the travel safety of the trailer or be designed such that switching over into generator operation only occurs when significant energy recovery is to be expected. This has the advantage that travel safety is not impaired by the inventive method, and a particularly economical operation is possible.

For example, the further condition can be that the amount of force acting on the coupling device of the trailer exceeds a predetermined minimum value. With this condition it is intended that switching over into generator operation can be prevented during a slight overrun operation that cannot be used for energy recovery.

Furthermore, the further condition can be that the wheel rotational speed of the trailer exceeds a predetermined minimum value. With this condition it is intended that switching over into generator operation is prevented when the trailer has already almost come to a stop and therefore only a very small degree of energy recovery is possible. The predetermined minimum value can be selected, for example, such that it corresponds to a speed of the trailer of 10 km/h.

The further condition can also be that the difference between the detected angle of rotation of the coupling device and the angle of rotation for a straight-ahead movement in the forward direction has an absolute value that does not exceed a predetermined maximum value. With this condition it is intended to prevent travel safety from being impaired by activating generator operation while cornering. The predetermined maximum value can be, for example, 10°.

The further condition can also be that the wheel contact force or a value correlated therewith fulfils a predetermined condition. This also serves for travel safety.

For switching over into generator operation a coupling can be controlled such that the rotational movement of a wheel of the trailer is transmitted to the electric drive/generator unit. The electric energy generated in generator operation can be fed into a battery.

In the disclosed method switching over into motor operation can occur when the force acting on the coupling device of the trailer runs in the direction of travel of the trailer. Under this condition it is to be assumed that the trailer is in traction operation and a contribution to driving the trailer is therefore useful.

It can be provided that it is switched-over into generator operation only when at least one further condition is fulfilled. The further condition can in particular relate to the travel safety of the trailer or be designed such that switching over into motor operation only occurs when it can be assumed from the further condition that the motor operation is efficient.

For example, the further condition can consist in that the amount of force acting on the coupling device of the trailer exceeds a predetermined minimum value. With this condition it is intended to be prevented that switching over into motor operation continuously occurs temporarily without this bringing a significant benefit with it.

The further condition can also consist in that the difference between the detected angle of rotation of the coupling device and the angle of rotation for a straight-ahead movement in the forward direction has an absolute value that does not exceed a predetermined maximum value. With this condition it is intended to be prevented that travel safety is impaired by an activating of motor operation during a cornering. The predetermined maximum value can be, for example, 10°.

The further condition can also consist in that the wheel contact force or a value correlated therewith fulfils a predetermined condition. This also serves for travel safety.

For switching over into motor operation, the coupling can be controlled such that the rotational movement of the electric drive/generator unit is transmitted to a wheel of the trailer. The electric energy required in motor operation can be taken from the battery.

The control device of the inventive axle subassembly can be designed such that with its help the inventive method can be embodied.

BRIEF DESCRIPTION OF THE DRAWINGS

The invention is explained below with reference to the exemplary embodiment shown in the drawings.

DETAILED DESCRIPTION

The inventive axle subassembly is adapted for use in trailers of vehicles, in particular commercial vehicles. A typical application case is a trailer of an articulated truck. There the inventive axle subassembly can be used for at least one of the typically three vehicle axles. The disclosure is described in the following based on the example of an articulated-truck trailer, but is not limited thereto, but rather also usable in other trailers.

Figure 1:
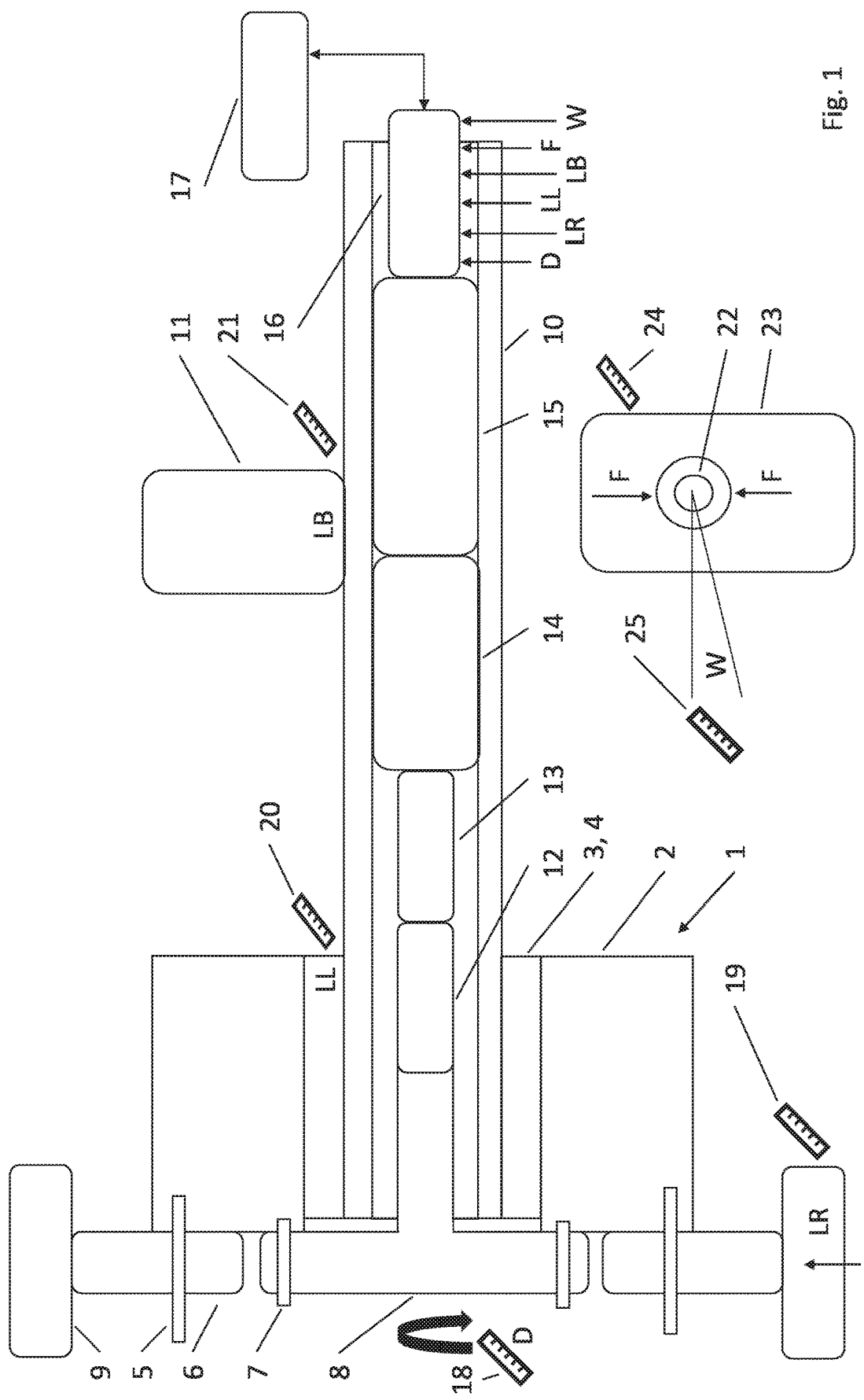
FIG. 1 is a schematic depiction of an exemplary embodiment of an axle subassembly according to an embodiment of the disclosure.

FIG. 1 schematically shows an exemplary embodiment of an inventively configured axle subassembly. The representation is highly abstracted and is intended to clarify the basic arrangement of the individual components, in particular with respect to their functional interaction, i.e., FIG. 1 does not represent the actual and to-scale geometric arrangement. The complete axle assembly is not depicted, but rather only the half of the axle assembly from the wheel side up to the center, since all components repeat after the center in a mirror-image manner. However, the axle assembly can also be modified such that some components are only present in a simpler embodiment. This is explained in more detail at another point.

The inventive axle subassembly includes a wheel bearing 1, including an outer ring 2 as well as a first inner ring 3 and a second inner ring 4. Details for the design of the wheel bearing 1 can be seen in FIGS. 2 to 4. The outer ring 2 is mechanically connected to a wheel adapter 6 by a set of first screws 5 and to a flange-type end of a shaft 8 by a set of second screws 7. A wheel 9 is attached to the wheel adapter 6. Accordingly the shaft 8 rotates in the same manner as the wheel 9. The mechanical connection of the outer ring 2 to the wheel adapter 6 is formed radially farther outward with respect to the axis of rotation of the outer ring 2 than the mechanical connection to the shaft 8.

The inner rings 3, 4 are mechanically connected to an axle tube 10 that concentrically surrounds the shaft 8. A bellows 11 of an air suspension is supported on the axle tube 10. Even with the shaft 8 rotating, the inner rings 3, 4 and the axle tube 10 remain at rest, i.e., they do not rotate.

In the region of its second end the shaft 8 is mechanically connected to a coupling 12. The coupling 12 is in turn mechanically connected to a constant velocity joint 13, for example, a tripod joint. The constant velocity joint 13 is mechanically connected to a transmission 14 that can be configured in particular as a planetary transmission. The transmission 14 is furthermore mechanically connected to an electric drive/generator unit 15 that is controlled by a control device 16.

A battery 17, for example, a lithium-ion battery, is connected to the control device 16. Furthermore, at least one sensor 18 for detecting the wheel rotational speed D, at least one sensor 19 for detecting a wheel contact force LR, at least one sensor 20 for detecting a bearing force LL, at least one sensor 21 for detecting a pressure LB in the bellows 11 of the air suspension, and further sensors for detecting the interaction between a kingpin 22 of the articulated-truck trailer and a yoke 23 of the articulated truck are connected to the control device 16. Here a first further sensor 24 detects the direction and the magnitude of a force F acting between the kingpin 22 and the yoke 23. This is referred to in the following as sensor 24 for detecting the force F on the kingpin 22. A second further sensor 25 detects an angle of rotation W by which the kingpin 22 is rotated relative to the yoke 23. This is referred to in the following as sensor 25 for detecting the angle of rotation W of the kingpin 22. The sensor 19 for detecting the wheel contact force LR, the sensor 20 for detecting the bearing force LL, and the sensor 21 for detecting the pressure LB in the bellows 11 of the air suspension provide partially redundant information so that one or more of these sensors can also be omitted.

Figure 2:
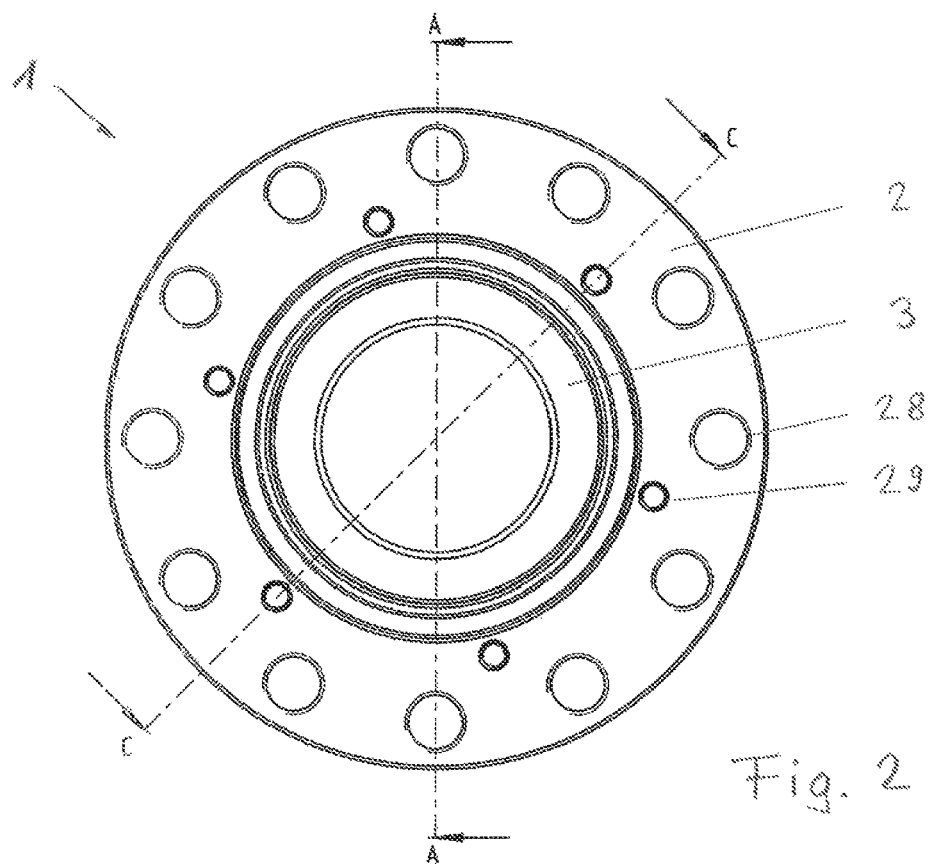
FIG. 2 is a plan view of a wheel bearing according to an embodiment of the present disclosure.
Figure 3:
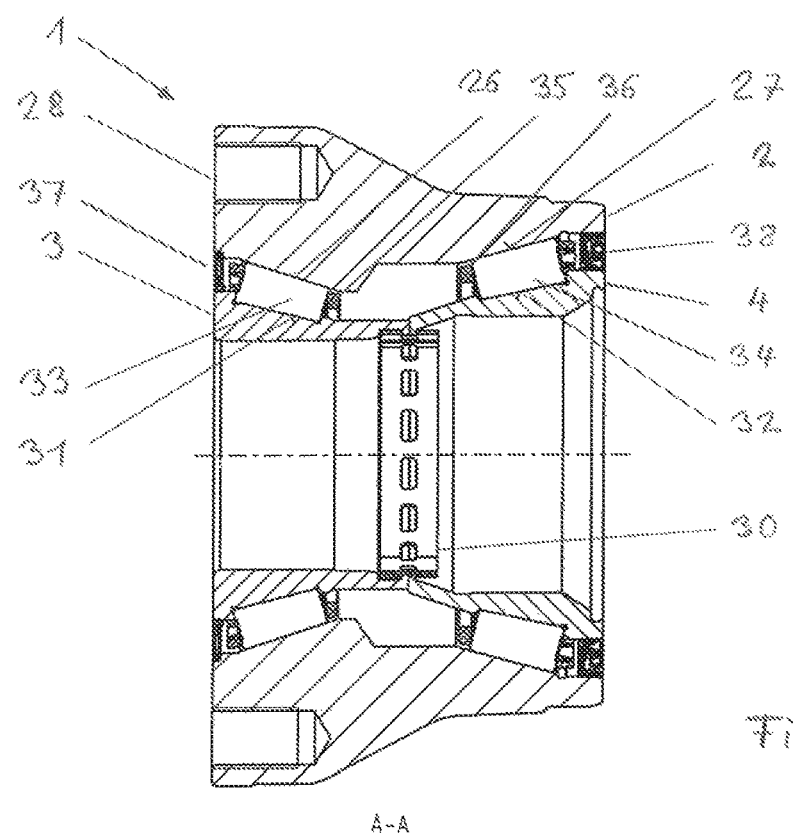
FIG. 3 is a sectional representation of the wheel bearing of FIG. 2 taken along line A-A.
Figure 4:
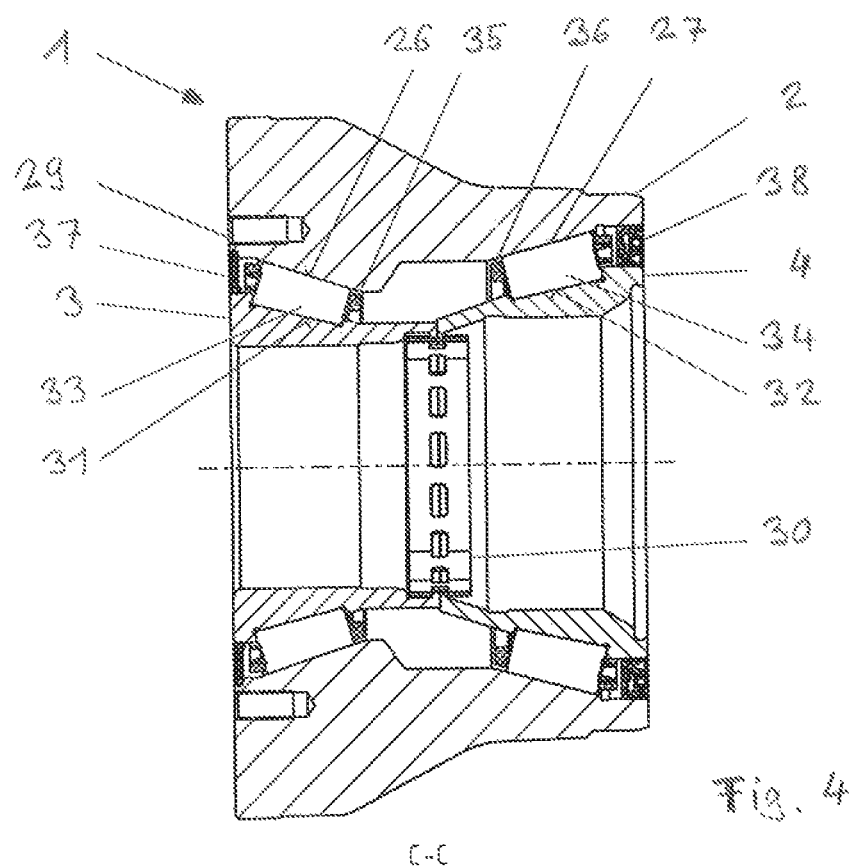
FIG. 4 is a further sectional view of the wheel bearing of FIG. 2 taken along line C-C.

Before the functioning of the inventive axle subassembly depicted in FIG. 1 is discussed in more detail, the design of the wheel bearing 1 shall first be described with reference to FIGS. 2 to 4.

The wheel bearing 1 is configured as a double-row tapered roller bearing. The outer ring 2 is forged as one piece and includes a first outer raceway 26 and a second outer raceway 27 that are disposed axially adjacent to each other at a distance. This means that both outer raceways 26, 27 are integral parts of the same component, and the outer ring 2 is not a component composed of a plurality of parts. Furthermore the outer ring 2 includes a set of first attachment bores 28 that are disposed along a first circumference. In addition, the outer ring 2 includes a set of second attachment bores 29 that are disposed along a second circumference, wherein the first circumference has a larger radius than the second circumference. The first attachment bores 28 and the second attachment bores 29 are offset from one another in the circumferential direction and are each embodied as threaded bores. The first attachment bores 28 have a significantly larger bore diameter than the second attachment bores 29. In addition, the number of first attachment bores 28 is greater than the number of second attachment bores 29. For example, twelve first attachment bores 28 and six second attachment bores 29 can be provided. The first attachment bores 28 serve for attaching the wheel adapter 6 or the rim to the outer ring 2. The second attachment bores 29 serve for attaching the shaft 8 to the outer ring 2.

The two inner rings 3, 4 are disposed axially adjacent to each other and contact each other axially in the exemplary embodiment depicted. The two inner rings 3, 4 are connected to each other in an interference-fit manner via a clamp ring 30 and are thereby secured against axial separation. The first inner ring 3 includes a first inner raceway 31. The second inner ring 4 includes a second inner raceway 32.

First rolling elements 33 roll between the first inner raceway 31 and the first outer raceway 26. Second rolling elements 34 roll between the second inner raceway 32 and the second outer raceway 27. The first rolling elements 33 and the second rolling elements 34 are each configured as tapered rollers. The first rolling elements 33 are guided in a first cage 35. The second rolling elements 34 are guided in a second cage 36.

The radial gap between the inner rings 3, 4 and the outer ring 2 is sealed outwardly in the region of the first inner ring 3 by a first seal 37 and in the region of the second inner ring 4 by a second seal 38.

In the following the functioning of the disclosed axle subassembly depicted in FIG. 1 is explained in more detail:

Overall the axle subassembly according to the disclosure serves to store excess energy, for example, during a braking process or downhill travel of the articulated truck, and later to make it available, for example, for a desired acceleration of the articulated truck. This function of energy recovery should be available automatically for the articulated truck equipped with the disclosed axle subassembly without the need for support by the tractor. In other words, the energy recovery is possible independently of the tractor to which the articulated-truck trailer equipped with the inventive axle subassembly is coupled, and the articulated-truck trailer is usable in mixed operation with conventional articulated-truck trailers. This is made possible by the fact that all components required for energy recovery are installed on the articulated-truck trailer, and all signals required for energy recovery are available in the region of the articulated-truck trailer and are independent of the type of tractor.

In order to make energy recovery possible, the electric drive/generator unit 15 of the disclosed axle subassembly can selectively be operated in two different operating states. The two operating states are i) generator operation and ii) motor operation. In generator operation the electric drive/generator unit 15 is operated as a generator and converts the mechanical energy of the rotating shaft 8 into electricity. The electricity thus generated is stored in the battery 17. In motor operation the electric drive/generator unit 15 is operated as a motor and converts the electricity stored in the battery 17 into mechanical energy and thereby drives the shaft 8. In addition to these two operating states, there is also a neutral state wherein the electric drive/generator unit 15 is neither operated as a generator nor as a motor, and the inventive axle subassembly behaves like a conventional axle subassembly without electric drive or regeneration function. In the neutral operating state the electric drive/generator unit 15 is decoupled from the shaft 8.

In the context of the disclosure it is provided to switch between the operating states of the electric drive/generator unit 15 such that on the one hand a high energy recovery is possible and on the other hand the travel safety is not impaired. In detail the procedure here is as follows:

It is first checked whether the articulated-truck trailer is in overrun operation. This can be the case, for example, during downhill travel or during braking. To detect the overrun operation the signal of the sensor 24 is evaluated for the force F on the kingpin 22. A force F acting on the kingpin 22 counter to the direction of travel of the articulated-truck trailer indicates that the articulated-truck trailer is in overrun operation. However, a switching over of the electric drive/generator unit 15 into generator operation is worthwhile only in the event of a sufficiently pronounced overrun operation. For this reason it can be provided that not only the direction but also the magnitude of the force F on the kingpin 22 is determined. If in addition to the detected force direction counter to the direction of travel the magnitude of the force F exceeds a predetermined minimum value, it is worthwhile to switch over the electric drive/generator unit 15 into generator operation. However, this does not mean that switching over into generator operation is effected in each case when the two mentioned conditions are fulfilled. In other words, they are merely necessary but not sufficient conditions. Before actually switching over into generator operation still further conditions are checked.

A first further condition relates to the wheel rotational speed D. According to this condition the switching over into generator operation is carried out only when the value detected by the sensor 18 for detecting the wheel rotational speed D exceeds a minimum value for the wheel rotational speed D. With this condition it is to be ensured that the articulated-truck trailer moves faster than a minimum speed, since otherwise a switching over into generator operation is not worthwhile. The minimum speed can be, for example, 10 km/h.

A second further condition relates to the angle of rotation W of the kingpin 22. According to this condition the switching over into generator operation is carried out only when the difference between the value detected by the sensor 25 for detecting the angle of rotation W of the kingpin 22 and a comparison value for a straight-ahead travel in the forward direction has an absolute value that does not exceed a predetermined maximum value. With this condition it is intended to prevent travel safety from being impaired by activating generator operation while cornering. The predetermined maximum value of the angle of rotation W can be, for example, 10°.

A third condition relates to the wheel contact force LR. According to this condition the switching over into generator operation is carried out only when the wheel contact force LR detected by the sensor 19 for detecting the wheel contact force falls between a predetermined minimum value and a predetermined maximum value. With this condition it is intended to prevent travel safety from being impaired by activating generator operation. This could be the case, for example, when the wheel contact force LR is, for example, very small or very large due to a laterally inclined roadway. It is also possible to compare the wheel contact forces on the left and the right side of the articulated-truck trailer to each other and to only carry out the switching over into generator operation when the difference of the wheel contact forces does not exceed a predetermined maximum value. Instead of or in addition to the wheel contact force LR, the bearing force LL and/or the pressure LB in the bellows 11 of the air suspension can also be evaluated in an analogous manner.

If the check of all conditions has shown that switching over into generator operation should occur, the control device 16 controls the coupling 12 such that an operative connection is formed between the shaft 8 and the constant velocity joint 13. The rotational movement of the wheel 9 is thus transmitted via the first screws 5 to the outer ring 2 and from there to the shaft 8 via the second screws 7. Since the second screws 7 do not need to be configured to hold the wheel 9 and to support braking forces, but rather only to allow the use of the mechanical energy of the rotational movement, the second screws 7 can be designed weaker than the first screws 5, and a smaller number suffices. Accordingly the first attachment bores 28 of the outer ring 2 each have a larger radius and are formed in larger number than the second attachment bores 29.

The constant velocity joint 13 thus rotates with the shaft 8, and this rotational movement is passed-on via the transmission 14 to the electric drive/generator unit 15. The mechanical energy of the rotational movement is converted by the electric drive/generator unit 15 into electricity that is fed by the control device 16 into the battery 17—optionally after processing of the electric signal. The battery 17 stores this electric energy for use when the electric drive/generator unit 15 is switched-over into motor operation.

If the articulated-truck trailer is not in overrun operation, it is checked whether it is in traction operation and if the electric drive/generator unit 15 should accordingly be switched-over into motor operation. A traction operation can also be present during accelerating of the articulated-truck trailer or during an uphill climb, or during travel on flat stretches and at constant speed, for example, due to the air resistance and the friction of the articulated-truck trailer. To detect the traction operation the signal of the sensor 24 is in turn evaluated for the force F on the kingpin 22. A force F acting on the kingpin 22 in the direction of travel of the articulated-truck trailer indicates that the articulated-truck trailer is in traction operation so that switching over into motor operation could be effected. In order to avoid excessive switching over, it can be provided that not only the direction but also the magnitude of the force F on the kingpin 22 is determined. In this case a switching over into motor operation only occurs if in addition to the detected force direction in the direction of travel, the magnitude of the force F exceeds a predetermined minimum value.

However, it is not switched over into motor operation in each case when an appropriate force direction and optionally an appropriate magnitude of the force F are detected. For efficiency and safety reasons, further conditions are also checked before actually switching over into motor operation. These further conditions can be determined in an analogous manner as for the switching over into generator operation, i.e., that the detected wheel rotational speed D must exceed a predetermined minimum value, the absolute value of the difference between the detected angle of rotation W of the kingpin 22 and a comparison value must not exceed a predetermined maximum value, and the detected wheel contact force LR or the detected bearing force LL or the detected pressure LB in the bellows 11 of the air suspension must fall between a predetermined minimum value and a predetermined maximum value, or must fulfill another condition.

If the check of all conditions has shown that switching over into generator operation should occur, the control device 16 controls the coupling 12 such that an operative connection is formed between the shaft 8 and the constant velocity joint 13. In addition, the control device 16 ensures that the electric drive/generator unit 15 is supplied with electricity from the battery 17 and thereby set into rotation.

The rotational movement of the electric drive/generator unit 15 is transmitted to the outer ring 2 via the transmission 14, the constant velocity joint 13, the coupling 12, the shaft 8, and the second screws 7. From there the rotational movement is transmitted via the first screws 5—optionally via a wheel adapter 6—to the wheel 9 and drives it.

There is the possibility that neither all conditions for the switching over into generator operation nor all conditions for the switching over into motor operation are fulfilled. In this case switching over into the neutral operating state occurs, or if the neutral operating state already exists it is maintained. The neutral operating state is characterized in that the electric drive/generator unit 15 neither feeds electricity into the battery 17 nor takes electricity therefrom. This can be achieved, for example, by the control device 16 not forming an electric connection between the electric drive/generator unit 15 and the battery 17. In addition, the coupling 12 is controlled by the control device 16 such that no operative connection is formed by the coupling 12 between the shaft 8 and the constant velocity joint 13. Accordingly the electric drive/generator unit 15 does not perform any rotational movement despite rotating wheels 9. The constant velocity joint 13 and the transmission 14 also remain in a state without rotational movement. In this way the mass of the rotating components can be kept low in standard operation.

Figure 5:
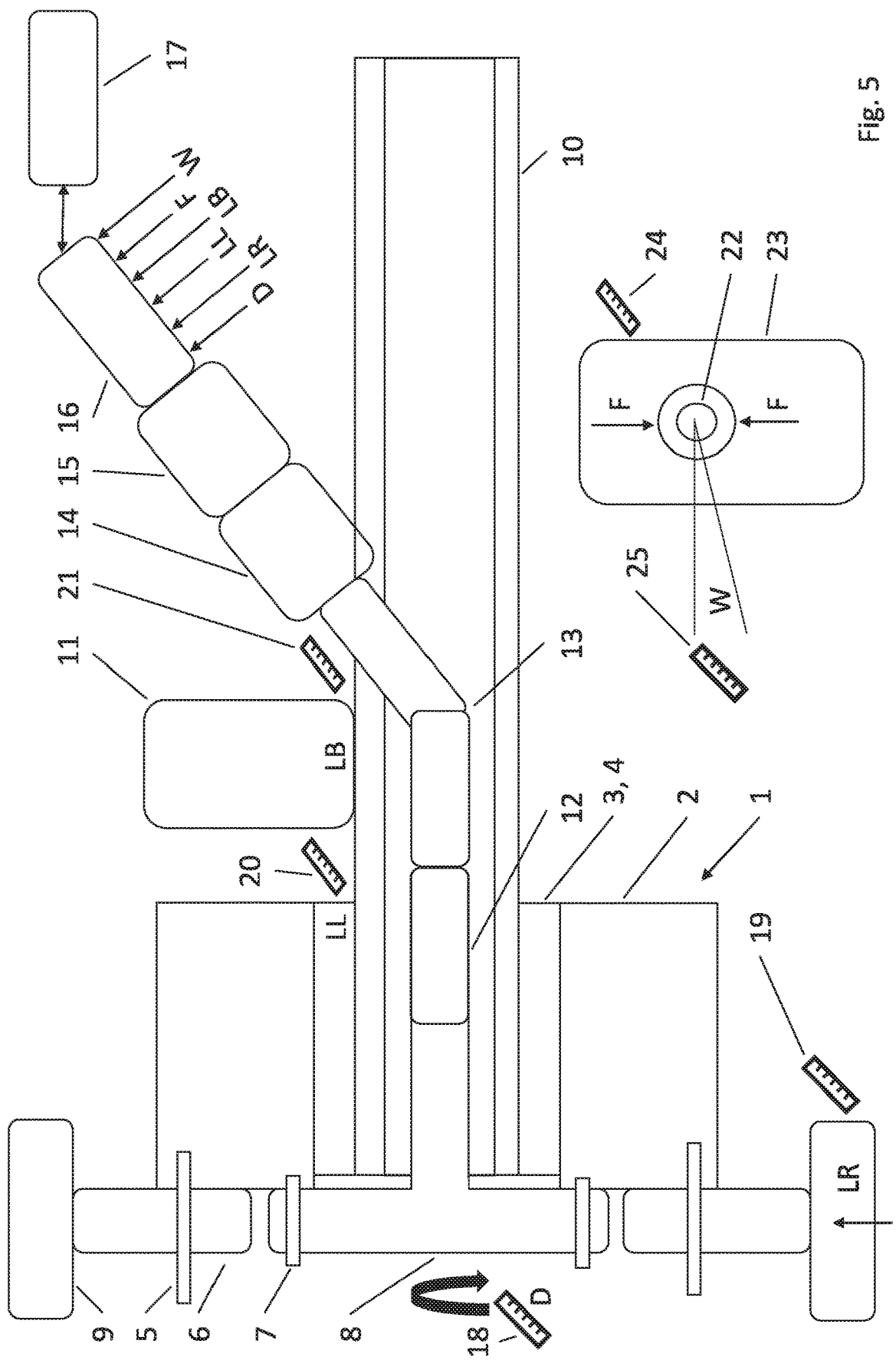
FIG. 5 is a schematic depiction of an axle subassembly according to an embodiment of the disclosure.

FIG. 5 shows a further exemplary embodiment of the axle subassembly according to the present disclosure in a representation corresponding to FIG. 1. The axle subassembly depicted in FIG. 5 differs from the exemplary embodiment of FIG. 1 essentially in that the constant velocity joint 13 is not installed unbent, but rather is so strongly angled that it penetrates a recess in the axle tube 10, so that the shaft 8 connected to the constant velocity joint 13 is disposed inside the axle tube 10, and the transmission 14, connected to the constant velocity joint 13, and the subsequent components are disposed outside the axle tube 10. Thus more installation space is available for these components, and, for example, a more strongly dimensioned electric drive/generator unit 15 can be installed. In such a case it is possible to equip only one of the axles of the articulated-truck trailer with the inventive axle subassembly. The other axles can be embodied conventionally.

Design and functionality otherwise correspond to the exemplary embodiment depicted in FIG. 1.

Figure 6:
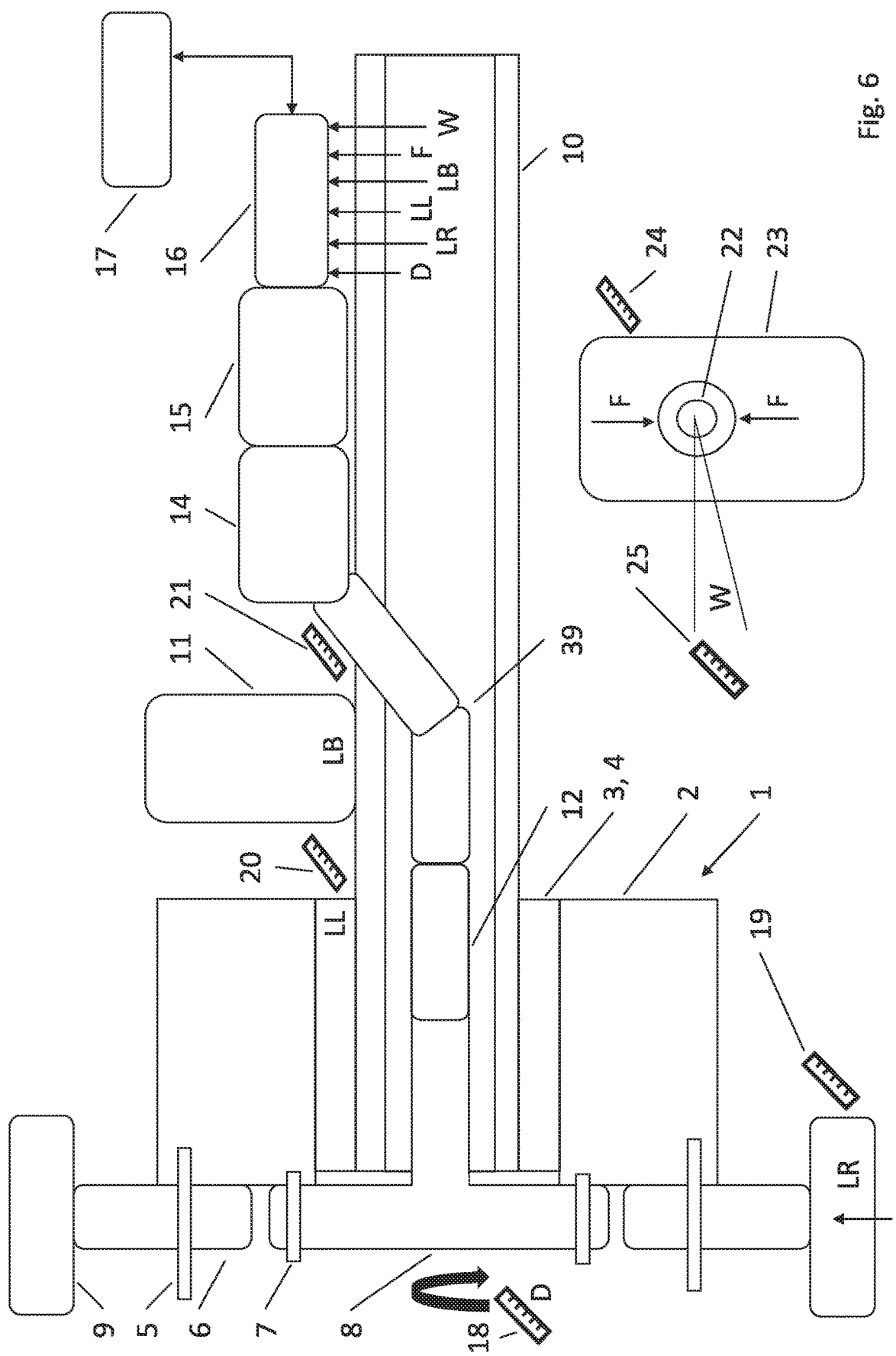
FIG. 6 is a schematic depiction of an axle subassembly according to an embodiment of the disclosure.

FIG. 6 shows an exemplary embodiment of the inventively configured axle subassembly, modified again, in a representation corresponding to FIG. 1. This exemplary embodiment largely corresponds to the exemplary embodiment depicted in FIG. 5. A difference exists insofar as in the exemplary embodiment according to FIG. 6, the inventive axle assembly includes an articulated shaft 39 instead of the constant velocity joint 13. Similar to the constant velocity joint 13 in the exemplary embodiment according to FIG. 5, in the exemplary embodiment according to FIG. 6, the articulated shaft 39 penetrates a recess in the axle tube 10 so that the shaft 8 connected to the articulated shaft 39 is disposed inside the axle tube 10, and the transmission 14 connected to the articulated shaft 39 and the subsequent components are disposed outside the axle tube 10. Corresponding space advantages thus arise as in the exemplary embodiment according to FIG. 5, which can also be used in a corresponding manner. However, in contrast to the constant velocity joint 13, the articulated shaft 39 makes possible an arrangement of the components gear 14, electric drive/generator unit 15 and control device 16 which is offset parallel to the shaft 8. Design and functionality otherwise correspond to the exemplary embodiment depicted in FIG. 5.

All above-described exemplary embodiments of the inventive axle assembly can also be modified such that the control device 16 and/or the battery 17 are each present only once and are used jointly by both half-axis assemblies. In the exemplary embodiments of FIGS. 1 and 6, it is also possible to provide only one electric drive/generator unit 15. However, in this case a differential transmission or something similar is required to compensate for any different conditions on both sides of the articulated-truck trailer.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved axle subassemblies having drive/generator units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Wheel bearing
2 Outer ring
3 First inner ring

4 Second inner ring
5 First screw
6 Wheel adapter
7 Second screw
8 Shaft
9 Wheel
10 Axle tube
11 Bellows
12 Coupling
13 Constant velocity joint
14 Transmission
15 Electric drive/generator unit
16 Control device
17 Battery
18 Sensor for detecting the wheel rotational speed
19 Sensor for detecting the wheel contact force
20 Sensor for detecting the bearing force
21 Sensor for detecting the pressure in the bellows of the air suspension
22 Kingpin
23 Yoke
24 Sensor for detecting the force on the kingpin
25 Sensor for detecting the angle of rotation of the kingpin
26 First outer raceway
27 Second outer raceway
28 First attachment bore
29 Second attachment bore
30 Clamp ring
31 First inner raceway
32 Second inner raceway
33 First rolling element
34 Second rolling element
35 First cage
36 Second cage
37 First seal
38 Second seal
39 Articulated shaft
D Wheel rotational speed
LR Wheel contact force
LL Bearing force
LB Pressure
F Force
W Angle of rotation

What is claimed is:

1. An axle subassembly of a trailer of a vehicle, comprising:
a rotatably supported shaft,
an electric drive/generator unit switchable from a first state for driving the shaft and a second state for generating electricity from rotational movement of the shaft, and
a wheel bearing having an outer ring,
wherein,
the outer ring includes a first number of first attachment bores disposed along a first circle and a second number of second attachment bores disposed along a second circle, the first circle having a larger radius than the second circle,
the plurality of second attachment bores are configured for forming a mechanical connection between the outer ring and the shaft.

2. The axle subassembly according to claim 1,
wherein the first number is larger than the second number and/or a diameter of each of the first attachment bores is respectively larger than a diameter of each of the second attachment bores.

3. An axle subassembly of a trailer of a vehicle, comprising:
a shaft;
a wheel bearing including an outer ring, the outer ring being mechanically connected to the shaft; and
an electric drive/generator operably connected to the shaft,
wherein the electric drive/generator is shiftable between a first state in which the electric drive/generator is configured to generate electricity from a rotation of the shaft and a second state in which the electric drive/generator is configured to drive the shaft, and
a controller configured to shift the electric drive/generator unit between the first state and the second state,
wherein the outer ring includes a first number of first attachment bores disposed along a first circle and a second number of second attachment bores disposed along a second circle, the first circle having a larger radius than the second circle, and
the plurality of second attachment bores are configured for forming a mechanical connection between the outer ring and the shaft.

4. An axle subassembly of a trailer of a vehicle, comprising:
a shaft;
a wheel bearing including an outer ring, the outer ring being mechanically connected to the shaft;
an electric drive/generator operably connected to the shaft,
wherein the electric drive/generator is shiftable between a first state in which the electric drive/generator is configured to generate electricity from a rotation of the shaft and a second state in which the electric drive/generator is configured to drive the shaft, and
a controller configured to shift the electric drive/generator unit between the first state and the second state,
wherein the electric drive/generator is connected to the shaft via a constant velocity joint or an articulated shaft, and via a coupling and via a transmission.

5. The axle subassembly according to claim 3, including a battery for storing electricity generated by the electric drive/generator.

6. The axle subassembly according to claim 3,
wherein the controller is configured to receive at least one input indicative of at least one condition of the trailer and/or the vehicle and to shift the electric drive/generator into the first state and into the second state based on a value of the at least one condition.

7. The axle subassembly according to claim 6,
wherein the at least one condition comprises a first condition and a second condition.

8. The axle subassembly according to claim 7,
wherein the first condition comprises a force at a coupling of the trailer and the vehicle and the second condition comprises an angle between a longitudinal axis of the trailer and a direction of travel of the vehicle being less than a predetermined value.

9. The axle subassembly according to claim 7,
wherein the first condition comprises a force at a coupling of the trailer and the vehicle and the second condition comprises a speed of the trailer.

10. The axle subassembly according to claim 3,
wherein the controller is configured to receive a first input indicative of a force at a coupling of the trailer and the vehicle and a direction of the force and to shift the electric drive/generator into the first state and the second state based on the first input.

11. The axle subassembly according to claim 3,
wherein the controller is configured to shift the electric drive/generator into the first state when the trailer is being braked by the vehicle and to shift the electric drive/generator unit into the second state when the electric drive/generator is accelerating the trailer.

12. A trailer of a vehicle, comprising:

a trailer body; and the axle subassembly according to claim 3.

13. The axle subassembly according to claim 1,
wherein the outer ring is mechanically connected to the shaft by a plurality of first fasteners in the second attachment bores.

14. The axle subassembly according to claim 3,
wherein the first number is larger than the second number and/or a diameter of each of the first attachment bores is respectively larger than a diameter of each of the second attachment bores.

\* \* \* \* \*